(12) United States Patent
Litwiller

(10) Patent No.: US 8,677,267 B2
(45) Date of Patent: Mar. 18, 2014

(54) METHOD AND SYSTEM FOR DISPLAYING ANNOTATED INFORMATION ASSOCIATED WITH A SETTABLE VARIABLE VALUE FEATURE

(75) Inventor: Debora Margaret Hejza Litwiller, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2993 days.

(21) Appl. No.: 10/801,464

(22) Filed: Mar. 16, 2004

(65) Prior Publication Data

US 2005/0210373 A1   Sep. 22, 2005

(51) Int. Cl.
*G06F 3/048* (2013.01)
*G03G 15/00* (2006.01)

(52) U.S. Cl.
USPC .............. 715/800; 715/854; 399/81; 399/367

(58) Field of Classification Search
USPC ............ 715/512, 800, 451, 854; 399/81, 367; 358/1.12
See application file for complete search history.

(56) References Cited

U.S. PATENT DOCUMENTS

| | | | |
|---|---|---|---|
| 4,575,227 A | 3/1986 | Ito et al. | |
| RE32,253 E | 9/1986 | Bartulis et al. | |
| 4,669,858 A | 6/1987 | Ito et al. | |
| 4,849,789 A | 7/1989 | Ito et al. | |
| 4,956,672 A | 9/1990 | Shibazaki | |
| 5,189,529 A * | 2/1993 | Ishiwata et al. | 358/451 |
| 5,463,448 A | 10/1995 | Wilson et al. | |
| 5,583,981 A * | 12/1996 | Pleyer | 715/800 |
| 5,585,891 A | 12/1996 | Altrieth et al. | |
| 5,594,740 A * | 1/1997 | LaDue | 455/410 |
| 5,614,993 A | 3/1997 | Smith et al. | |
| 5,727,129 A | 3/1998 | Barrett et al. | |
| 5,880,727 A * | 3/1999 | Barrett et al. | 715/854 |
| 6,411,787 B1 * | 6/2002 | Frederiksen et al. | 399/81 |
| 6,678,485 B1 | 1/2004 | Odani | |
| 6,859,287 B1 * | 2/2005 | Frederiksen et al. | 358/1.12 |
| 7,043,191 B2 * | 5/2006 | Fujii et al. | 399/367 |
| 2003/0070139 A1 * | 4/2003 | Marshall et al. | 715/512 |

* cited by examiner

*Primary Examiner* — Boris Pesin
*Assistant Examiner* — Matthew Ell
(74) *Attorney, Agent, or Firm* — Michael J. Nickerson; Basch & Nickerson LLP

(57) ABSTRACT

A method and user interface which enables the setting of a variable value feature, having a plurality of values associated therewith, wherein the plurality of values include a default value and a plurality of non-default values. The method and user interface displays a first value associated with a user selected variable value feature and changes the displayed first value associated with the selected variable value feature by a predetermined amount so as to display a second value associated with the selected variable value feature by a user engaging a user activatable area associated with the selected variable value feature. The method and user interface determines if an annotated message is associated with the displayed second value associated with the selected variable value feature and displays the annotated message associated with the selected variable value feature along with the displayed second value associated with the selected variable value feature when it is determined that the displayed second value associated with the selected variable value feature has an associated annotation message.

20 Claims, 8 Drawing Sheets

METHOD AND SYSTEM FOR DISPLAYING ANNOTATED INFORMATION ASSOCIATED WITH A SETTABLE VARIABLE VALUE FEATURE

FIELD OF THE PRESENT INVENTION

The present invention is directed to a user interface or control console having the capability to set a value of a variable value feature or parameter. More specifically, the present invention is directed to a user interface or control console that displays annotated information associated with certain predetermined values of a variable value feature when the predetermined values of the variable value feature are selected or displayed.

BACKGROUND OF THE PRESENT INVENTION

Currently stand-alone devices with control panels and displays are being designed to support multiple functionalities with their associated feature enhancements. However, due to limited physical space and hardware costs, designers have been challenged with how to offer and manage the increased complexity of the expanded functionality of these devices without sacrificing ease of use to the user. An example of a stand-alone device having a control panel and/or display supporting multiple functionalities with their associated feature enhancements is a conventional office copier.

Traditionally, the copier, in the office equipment context, refers to a light lens xerographic copier in which paper originals are in fact photographed. The images are focused on an area of a photoreceptor, which is subsequently developed with toner. The developed image on the photoreceptor is then transferred to a copy sheet that in turn is used to create a permanent copy of the original.

However, the office copier may be a digital copier that performs the same functions as a light lens copier, except that the original image to be copied is not directly focused on a photoreceptor. Instead, with a digital copier, the original image is scanned by a device generally known as a raster input scanner that is typically in the form of the linear array of small photosensors.

The original image is focused on the photosensors in the raster input scanner. The photosensors convert the various light and dark areas of the original image to a set of digital signals. These digital signals are temporarily retained in a memory and then eventually used to operate a digital printing apparatus when it is desired to print copies of the original. The digital signals may also be sent directly to the printing device without being stored in a memory.

The digital printing apparatus can be any known type of printing system responsive to digital data, such as a modulating scanning laser which discharges image wide portions of a photoreceptor, or an ink jet printhead.

Moreover, with the advent of the digitalization of the office copier, there has also been made available digital multi-function machines. The digital multi-function machine is a single machine that provides a user with more than one function. An example of a typical multi-function machine would include a digital facsimile function, a digital printing function, and a digital copy function.

An example of the basic architecture of a digital multi-function machine is illustrated in FIG. 2. As illustrated in FIG. 2, the architecture of the digital multi-function machine includes a scanner 3 that converts an original image into a set of digital signals that can be either stored or reproduced. The scanner 3 is connected to a central bus system 1 which may be either a single bus or a plurality of buses that provide interconnections and intercommunications between the various modules and devices on a multi-function digital machine.

The digital multi-function machine, as illustrated in FIG. 2, further includes a digital printing device 23 which converts digital signals representing an image into a hardcopy of that image on a recording medium whether the recording medium be paper, transparency, or other type of markable medium. The digital multi-function machine also includes a memory 21 for storing a variety of types of digital information such as machine fault information, machine history information, digital images to be processed at a later time, instruction sets for the machine, job instruction sets, etc.

In addition to the memory 21, a typical digital multi-function machine includes an electronic pre-collation memory section 7 that may store the digital representation of the image being presently rendered by the digital printing device 23. In the electronic pre-collation memory 7, the digital image is already laid out in its page structure so that it can be readily rendered by the digital printing device 23.

The digital multi-function machine as illustrated in FIG. 2, further includes a user interface 5 which allows the user to select the various functions of the multi-function machine, program various job attributes for the particularly selected function, provide other input to the multi-function machine as well as display informational data from the digital multi-function machine.

If the digital multi-function machine were connected to a network, the digital multi-function machine would include a network interface 19 and an electronic subsystem controller 9 that would control the interrelationship between the various modules or devices on the digital multi-function machine and the network.

To enable a facsimile function, a digital multi-function machine could include, typically, a voice/data modem 11 and a telephone circuit board 13. Moreover, the digital multi-function machine may include input/output drives 17 such as a floppy disc drive, a CD ROM drive, a tape drive, or other type of drive that can accept a portable memory device.

In some digital multi-function machines, the machine also includes a finisher 29 which can perform certain operations upon the printed output from the printing device 23. Lastly, the digital multi-function machine includes a controller 15 that controls all the functions within the multi-function device so as to coordinate all the interactions between the various modules and devices.

FIG. 1 illustrates an overall construction of a digital multi-function machine. The digital multi-function machine, as illustrated in FIG. 1, includes a scanning station 35, a printing station 55, and a user interface 50. The digital multi-function machine may also include a finisher device 45 that may be a sorter, tower mailbox, stapler, etc. The printing station 55 may include a plurality of paper trays 40 that store the paper used in the printing process. Lastly, the digital multi-function machine may include a high capacity feeder 30 that is capable of holding large amounts of paper stock to be used by the machine.

In a typical scanning function, the operator would utilize the scanning station 30 to scan in the images from the original documents. This scanning station 30 may be a platen type scanner or may include a constant velocity transport system that moves the original documents across a stationary scanning device. Moreover, the scanning station 30 may also include a document handling system that is capable of placing the original documents, automatically, on the glass platen for scanning.

With respect to the printing functions, the printing station 55 would retrieve the proper paper from one of the multiple paper trays or the high capacity feeder, render the desired image on the retrieved paper, and output the printed image to the finishing device 45 for further operations. The user interface 50 allows the user to control the various functions of the digital multi-function machine by presenting various types of screens to the user that provides the user an opportunity to program certain job characteristics or function characteristics.

As with the migration of traditional light lens copiers to digital machines, the user-programmable features on a reprographic system have improved and increased. More specifically, the early reprographic systems included only a minimal number of user-programmable features, such as reduction, lighter/darker, and number of copies. As the reprographic machines evolved with technology, the user-programmable features became numerous. This increase in the population in the number of user-programmable features causes the user interfaces of the reprographic machine to increase in size, thereby creating new problems when trying to design a compact machine.

One proposed solution is a user interface that is an interactive electronic display having multiple levels or multiple screens. The user of such an interface user can navigate through various screens to select the desired user-programmable features or attributes. More specifically, the user may encounter a main copying screen and navigational buttons to get to other screens or layered screens so as to program different features or attributes associated with those navigational buttons.

For example, a main copying screen may have a navigational button associated with the feature of reduction/enlargement. By activating this navigational button, the user interface would display a screen that has a plurality of reduction/enlargement activatable buttons as well as other programmable areas that allow the user to program a variety of reduction/enlargement values.

Although the utilization of such a multi-level or multi-screen system allows the user to program a multitude of features for the copying machine while maintaining a compact user interface, the utilization of multi-screens can also cause problems. For example, a typical scheme requires a user to navigate through various levels of the screens to program commonly used features or attributes into the reprographic system.

FIGS. 3 and 4 illustrate another prior art solution in which a user interface utilizes the multiple screens and multiple layers of an interactive electronic display user interface, but which has a main copying screen from which a user can readily program a few desired commonly used features without requiring a user to navigate through a plurality of screens.

As illustrated in FIG. 3, the basic copy function screen 50 includes a message area 510, a navigational area 520, and a programmable area 530. In the message area 510, the digital copier will display various messages for the user informing the user of either the status of the machine or assists the user in programming a particular job. In the navigational area 520, the user may select any of the activatable tabs 521 in order to bring the features associated with that tab forward onto the screen and allowing the present features to fall behind the activated or engaged tab.

Moreover, the navigational area 520 includes navigational buttons 522 which allow the user to navigate to other various screens for carrying out other functions with respect to the reprographic system such as maintenance functions, key operator programming functions, supervisory functions, or diagnostic functions, etc. Lastly, the programmable area 530 of screen 50 includes a plurality of activatable areas wherein each activatable area is associated with a certain value, function, or linked screen.

For example, as illustrated in FIG. 3, activatable area 531 is associated with the preset reduction/enlargement value of 100%. On the other hand, activatable area 532 of FIG. 3 is associated with a linked screen, more specifically, the screen as illustrated in FIG. 4. Thus, upon engagement or activation of the activatable area 532, the present invention will cause the screen as illustrated in FIG. 4 to replace the screen illustrated in FIG. 3 on the user interface.

Other activatable areas on the basic copy function screen 50 of FIG. 3 include reduction/enlargement preset activatable areas 533 and 534 that correspond to the preset reduction value 64% and 78%, respectively. Another activatable area with respect to reduction/enlargement on the basic copy function screen 50 is the activatable area 535 which corresponds to an auto-function in that when it is selected or engaged, the reprographic system will automatically size the scanned in image to fit properly upon the output recording medium.

As illustrated in FIG. 4, a display screen 50 includes a message area 510, a user control area 540, and programmable area 550. The user control area 540 allows the user to either cancel the selection of this programming screen, reset the programming within this programming screen, or save the programming associated with this programming screen so as to be utilized by the reprographic system when performing the job being programmed.

The programmable area 550 of the display screen 50 includes a plurality of activatable reduction/enlargement preset areas 551. Moreover, the programmable area 550 includes a display area 554 that displays the current reduction/enlargement setting. The current reduction/enlargement setting can be either increased or decreased by activatable areas 552 and 553, respectively. Lastly, the programmable area 550 includes activatable areas 556 and 555 wherein activatable area 556 allows the user to program in normal reduction/enlargement values; i.e., the values illustrated in FIG. 4; while activatable area 555 allows the user to program anamorphic reduction/enlargement values through another screen.

Although the touch screen example of FIGS. 3 and 4 provide an improvement over past systems, the footprint of the display device or screen stills requires a substantial amount of area to provide the user with all the necessary information to make an informed selection of the variable value for the desired feature being programmed or set.

Another possible solution to reducing the footprint of the display device is to utilize a non-touch screen control panel. In such a system, the control panel has a small display area that displays the information corresponding to the current parameters of the machine or the current parameters of the feature being programmed. Moreover, this includes a plurality of hardwired push buttons which functionality changes as the display on the display device changes. The most common embodiment of this system has four push buttons orientated in or representing four orthogonal directions. The buttons can be used for navigation between screens and for establishing and setting the desired variable value for a feature.

These non-touch screen control panels conventionally offered a menu selection within a liquid crystal display device that forced users to navigate through multiple layers of menus to obtain the selection or value desired using scrolling and enter selection keys. Features may have several submenus that bucket values in a logical manner. To access a particular value, the user must navigate through the submenus to select the value. This caused documented customer dissatisfaction with the product and perceived complexity.

Therefore, it is desirable to provide a user interface or control panel that allows the displaying and setting of the multiple functions and their associated enhancement features in a more obvious and easy to use method with or without the use of a touch screen display. Moreover, it is desirable to provide a user interface or control panel that includes multiple layers of menus for a variable value feature that historically offered users a discreet selection of values.

Furthermore, it is desirable to provide a user interface or control panel that enables a selection value scroll that incorporates a variable value, a predetermined value that has worded descriptors attached thereto, special effect values, and a defaulted value of the equipment. More specifically, it is desirable to provide a user interface or control panel that allows the user to scroll the scale and when a predetermined value is presented, the timing of the scroll pauses momentarily, allowing a predetermined value, along with its descriptor is displayed to the user.

SUMMARY OF THE PRESENT INVENTION

One aspect of the present invention is a method of setting a variable value feature, having a plurality of values associated therewith, wherein the plurality of values include a default value and a plurality of non-default values, on a user interface, the user interface having user activatable areas enabling a selection and changing of the variable value feature. The method displays on the user interface a first value associated with a user selected variable value feature; changes the displayed first value associated with the selected variable value feature by a predetermined amount so as to display a second value associated with the selected variable value feature by a user engaging a user activatable area of the user interface associated with the selected variable value feature; determines if an annotated message is associated with the displayed second value associated with the selected variable value feature; and displays the annotated message associated with the selected variable value feature along with the displayed second value associated with the selected variable value feature when it is determined that the displayed second value associated with the selected variable value feature has an associated annotation message.

Another aspect of the present invention is a user interface for selecting and setting a variable value feature that has a plurality of values associated therewith, wherein the plurality of values include a default value and a plurality of non-default values. The user interface comprising a display area to display a first value associated with a user selected variable value feature; a user activatable area to change the displayed first value associated with the selected variable value feature by a predetermined amount so as to display a second value associated with the selected variable value feature; a memory for storing a number of annotated messages, each annotated message being associated with a non-default value of the variable value feature; and a controller to determine if a stored annotated message is associated with the displayed second value associated with the selected variable value feature. The controller causing the display area to display the annotated message associated with the selected variable value feature along with the displayed second value associated with the selected variable value feature when it is determined that the displayed second value associated with the selected variable value feature has an associated annotation message.

A third aspect of the present invention is a method of setting a variable value feature on a control panel, the variable value feature having a plurality of values associated therewith, wherein the plurality of values include a default value, at least one industry accepted standard value, and a plurality of non-default values, the control panel having user activatable areas enabling a selection and changing of the variable value feature. The method displays, on a display device, a first value associated with a user selected variable value feature; changes the displayed first value associated with the selected variable value feature by a predetermined amount so as to display a second value associated with the selected variable value feature by a user engaging one of the user activatable areas of the control panel associated with the selected variable value feature; determines if the displayed second value is an industry accepted standard value associated with the selected variable value feature; and displays an annotated message corresponding to the industry accepted standard value and associated with the selected variable value feature along with the displayed second value associated with the selected variable value feature when it is determined that the displayed second value is an industry accepted standard value associated with the selected variable value feature.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
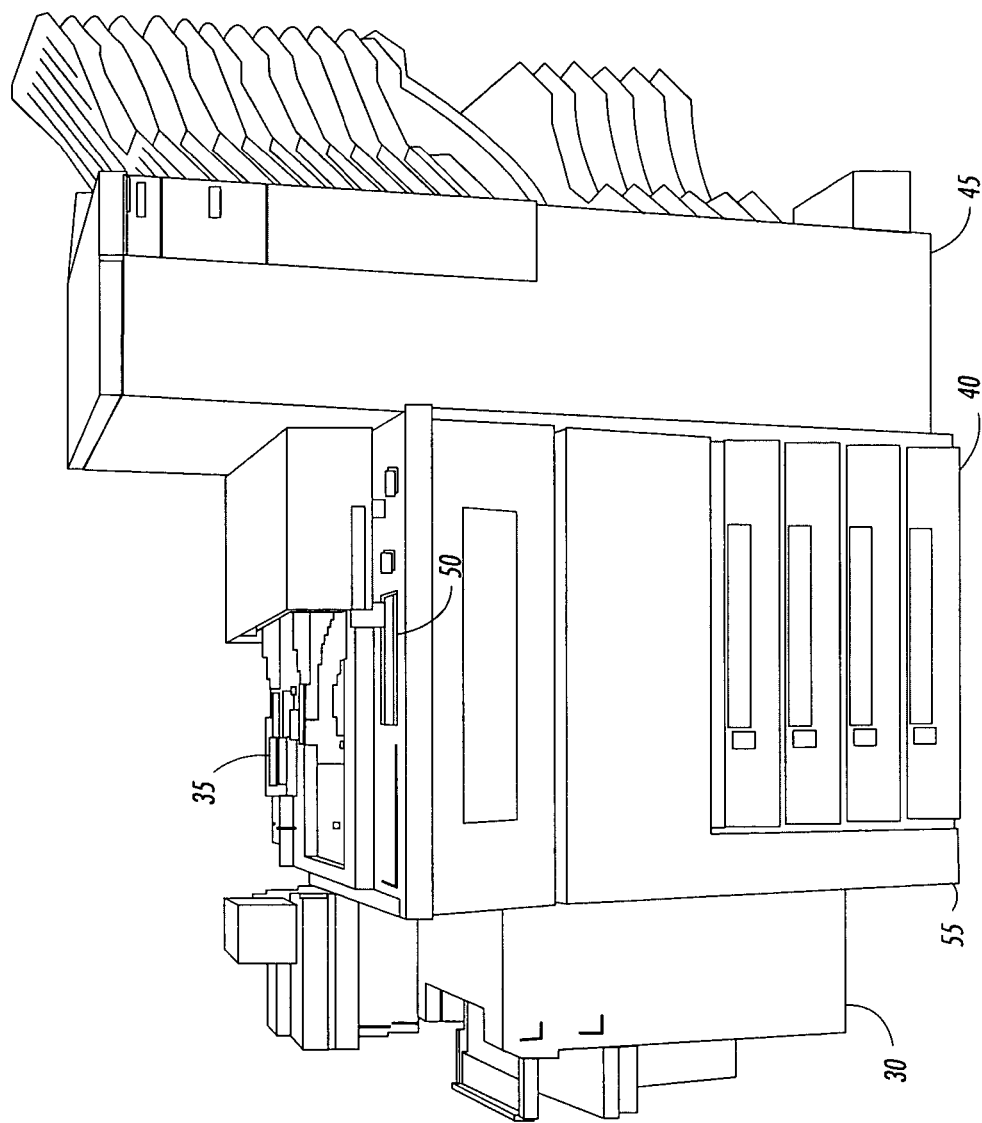
FIG. 1 is a graphic representation of a prior art digital multi-function machine.
Figure 2:
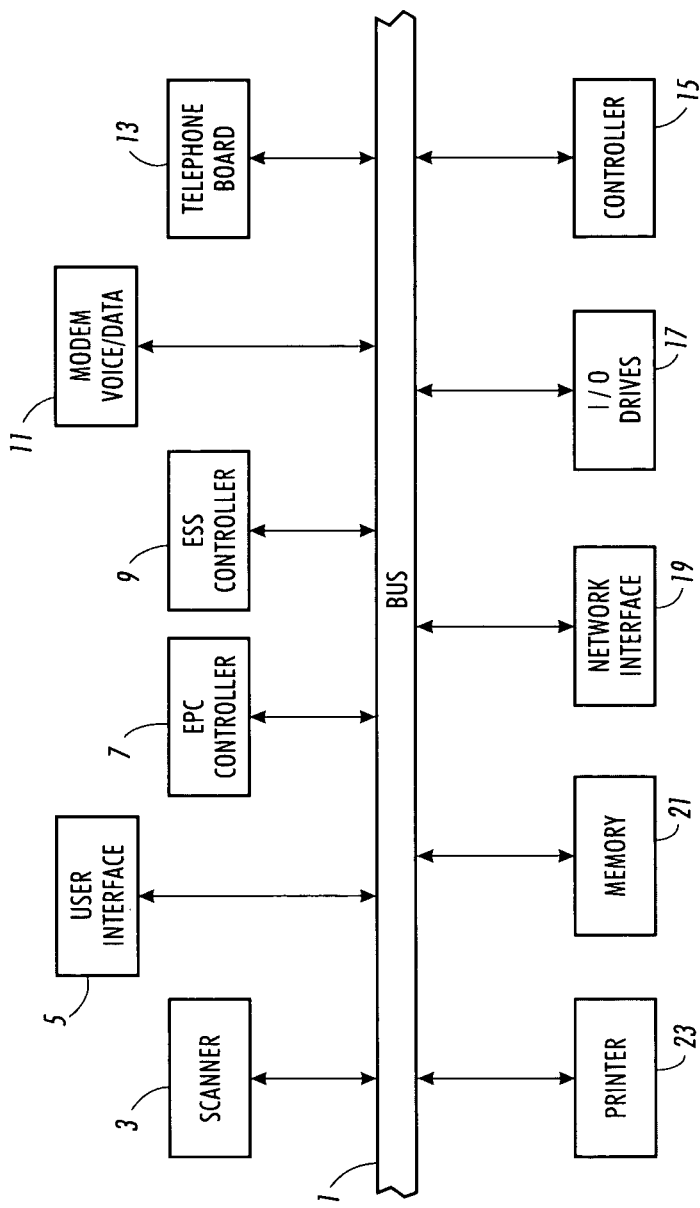
FIG. 2 is a block diagram illustrating the architecture of a prior art digital multi-function machine.
Figure 3:
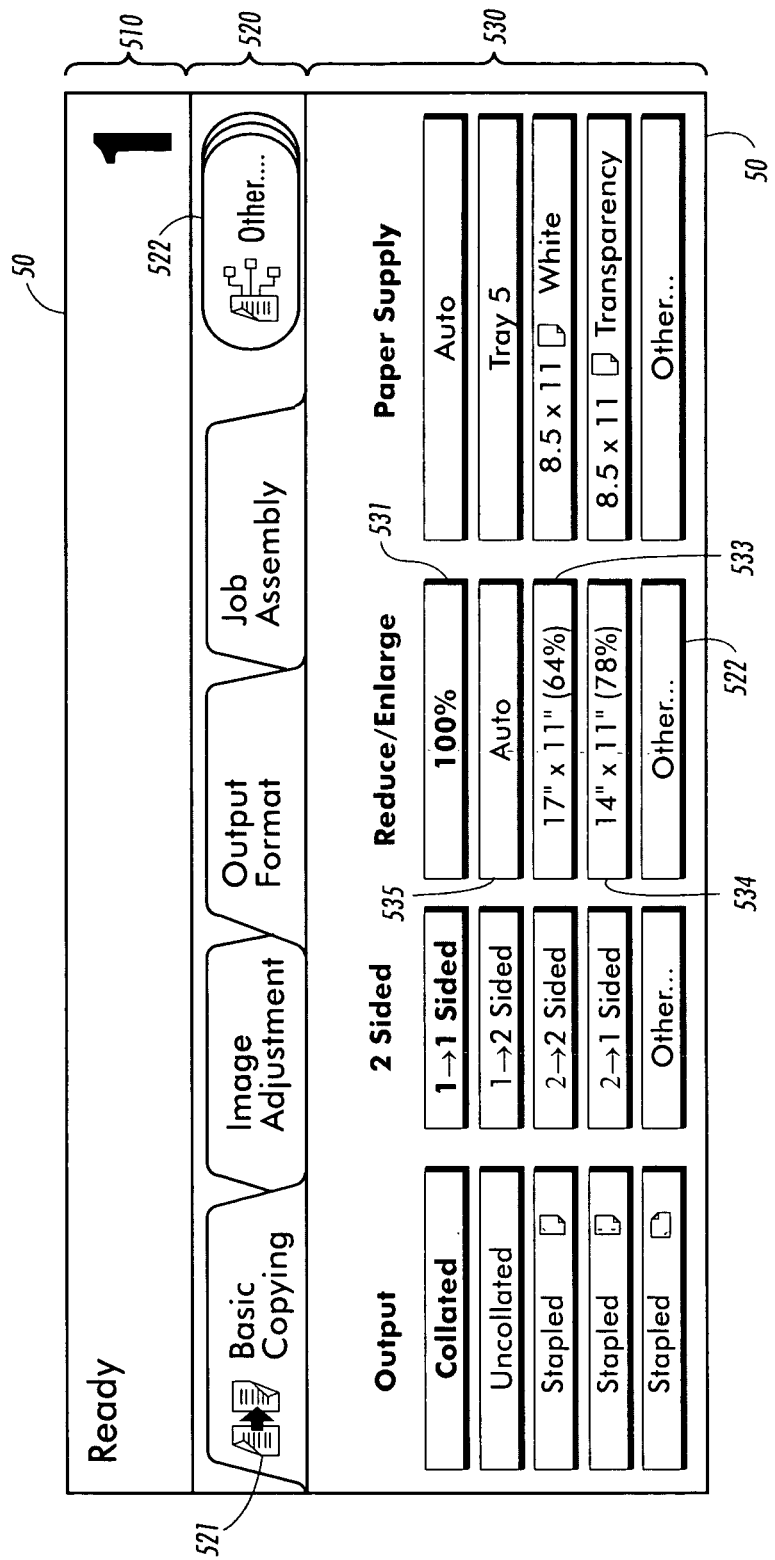
FIG. 3 illustrates a prior art user interface screen layout showing a main copying screen.
Figure 4:
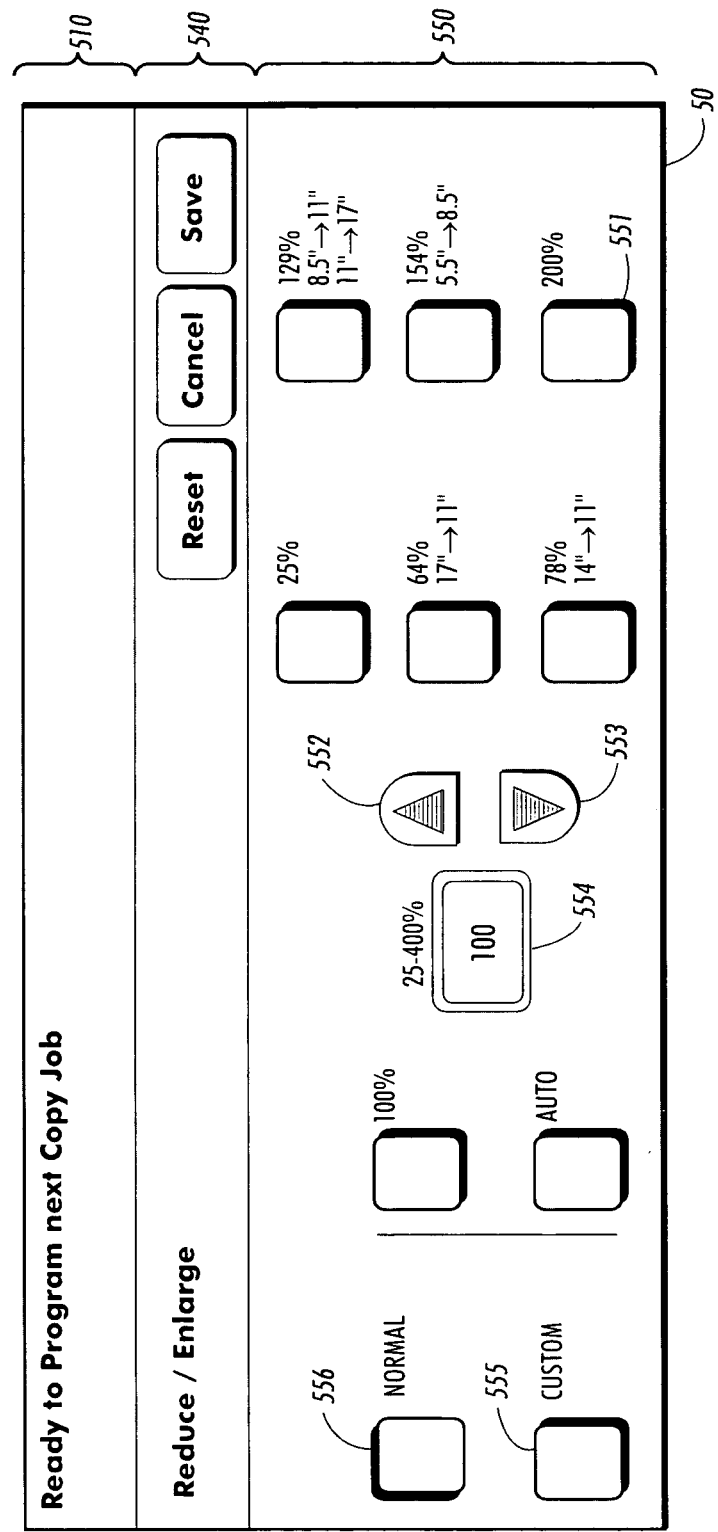
FIG. 4 illustrates a prior art user interface screen layout used for programming reduction/enlargement values.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions may have been purposely drawn disproportionately so that the features and concepts of the present invention could be properly illustrated.

As noted above, the present invention is directed to a user interface and, in particular, to a user interface that displays annotated messages associated with industry accepted standard values or preset values of a variable value feature. The user interface of the present invention can be utilized in a variety of devices including, for example, reprographic systems, digital scanning systems, facsimile machines, multifunction machines, thermostats, radio tuners, or any other device that has allows the user to select from a range of variable values for a feature of the device wherein the range of variable values includes industry accepted standard values or preset values therein.

To provide an enhanced description of the concepts of the present invention, the present invention will be described below with respect to a copier function of a digital multifunction machine with the variable value feature being the reduction/enlargement or magnification function. Other variable value features that could have been used for demonstrative purposes include, but are not limited to, facsimile transmission and contrast.

Figure 5:
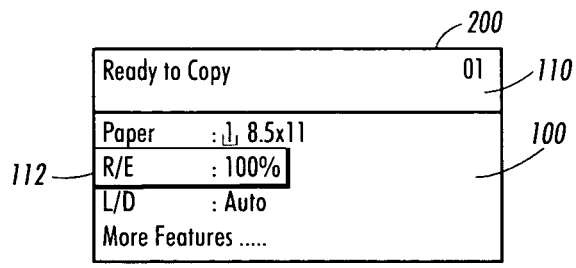
FIG. 5 illustrates a user interface screen layout showing a main screen according to the concepts of the present invention.

FIG. 5 illustrates an example of a main screen for a copier according to the concepts of the present invention. In the following description of FIGS. 5-11, it is assumed that the user interface is a touch screen; however, as will be described in more detail below, the concepts of FIGS. 5-11 are also applicable to a non-touch screen environment with hardwired push buttons.

As illustrated in FIG. 5, the touch display screen 200 includes a general message area 110 that may convey general information to the user as to the current status of the device, whether it be, as in this example, the displays indicates that the machine is ready to make a single copy of the original, or an error message indicating the machine has faulted. In the message area 110, the multifunction machine may also display various messages to assist the user in programming the multifunction machine. The touch display screen 200 also includes a programmable area 100 that in this example provides a list of variable value features 112.

Figure 6:
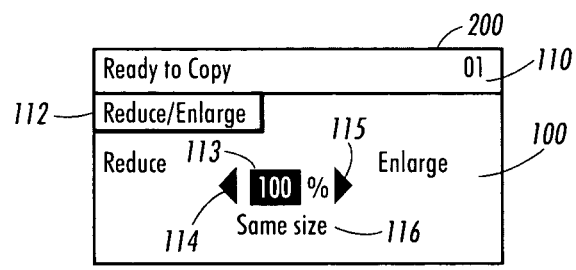
FIGS. 6 through 10 are graphical representations of a user interface screen used for setting magnification values according to the concepts of the present invention.

FIG. 6 is a graphical representation of a collapsed feature screen of the present invention. As illustrated in FIG. 6, the programmable area 100 of the touch display screen 200 displays the selected variable value feature 112, a present value 113 for the selected variable value feature 112, an increment activatable area 114, a decrement activatable area 115, and an annotated message 116. The annotated message 116, in this particular example is associated with the predetermined value of 1 to 1 magnification or 100% reduction/enlargement. The value 113 can be changed by a predetermined amount by activating either user activatable areas 114 (decrement) or 115 (increment).

In a preferred embodiment of the present invention, the annotated message 116 is stored in a memory device associated with the machine. When a controller associated with the machine determines that the displayed value 113 is associated with a stored annotated message 116, the controller causes the annotated message 116 to be displayed on programmable area 100 of the touch display screen 200 simultaneously with and in close proximity with the displayed value 113

Figure 7:
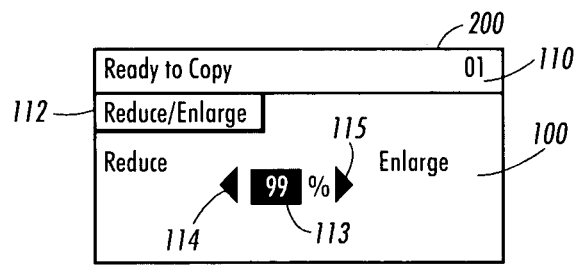

FIG. 7 illustrates the collapsed feature screen of the present invention after the activatable area 114 has been engaged by the user a single time. Upon this engagement, the programmable area 100 of the touch display screen 200 displays the new present value 113, in this example 99%. However, since the value 99% has not been designated as a preset value for reduction/enlargement or it is not an industry accepted standard, the value 99% does not have an associated annotated message or information stored in a memory, thereby causing the programmable area 100 of the touch display screen 200 to display the new present value 113 without any corresponding annotated message.

As the user further decrements the value for the feature, the present value will eventually become associated with another preset value for reduction/enlargement or industry accepted standard value. Such a situation is illustrated in FIG. 8.

Figure 8:
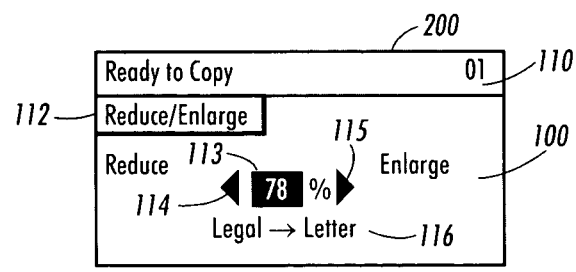

As illustrated in FIG. 8, when the present value 113 becomes equal to a preset value for reduction/enlargement or industry accepted standard value, in this example 78%, the programmable area 100 of the touch display screen 200 displays the new present value 113 (78%) and the associated annotated information or message 116 (Legal→Letter).

In a preferred embodiment of the present invention, when the programmable area 100 of the touch display screen 200 displays a new present value 113 and the associated annotated information or message 116, the device causes the user activatable areas 114 and 115 of the user interface to become disabled for a predetermined amount of time to allow the user to recognize that a preset value or industry accepted standard value has been reached. After the predetermined amount of time has elapsed, the device enables the user activatable areas 114 and 115 so that the value 113 may be incremented or decremented by the user.

As the user further decrements the value for the feature, the present value will eventually become associated a lower limit for the feature. Such a situation is illustrated in FIG. 9.

Figure 9:
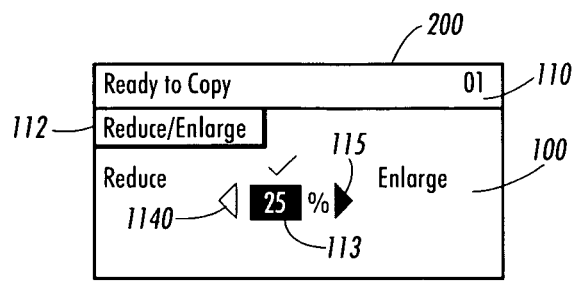

As illustrated in FIG. 9, when the present value 113 becomes equal to the lower limit value for reduction/enlargement, in this example 25%, the programmable area 100 of the touch display screen 200 displays the new present value 113 (25%) and de-highlights user activatable area 1140 to inform the user that the value cannot be taken any lower. However, activatable area 115 remains highlighted indicating to the user that it is active.

On the other hand, as the user further increments the value for the feature, the present value will eventually become associated an upper limit for the feature. Such a situation is illustrated in FIG. 10.

Figure 10:
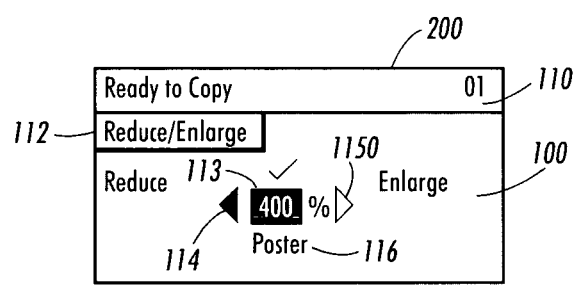

As illustrated in FIG. 10, when the present value 113 becomes equal to the upper limit value for reduction/enlargement, in this example 400%, the programmable area 100 of the touch display screen 200 displays the new present value 113 (100%) and de-highlights user activatable area 1150 to inform the user that the value cannot be taken any higher. However, activatable area 114 remains highlighted indicating to the user that it is active. It is further noted that the upper limit value (400%) is also associated with a preset value for reduction/enlargement or industry accepted standard value so that the programmable area 100 of the touch display screen 200 displays the associated annotated message or information 116 (Poster).

Figure 11:
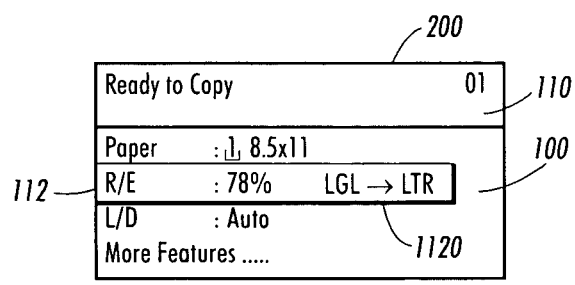
FIG. 11 is a graphical representation of a user interface screen showing a main copying screen after the magnification value has been set according to the concepts of the present invention.

Upon setting the machine to the desires values, the programmable area 100 of the touch display screen 200 reverts back to a current status display as shown in FIG. 11. In FIG. 11, the new present value of the feature 112 is displayed along with it associated annotated message or information 1120, if any. In this example, the programmable area 100 of the touch display screen 200 displays the new present value of the feature 112 (78%) and its associated annotated information 1120 (Legal→Letter).

Figure 12:
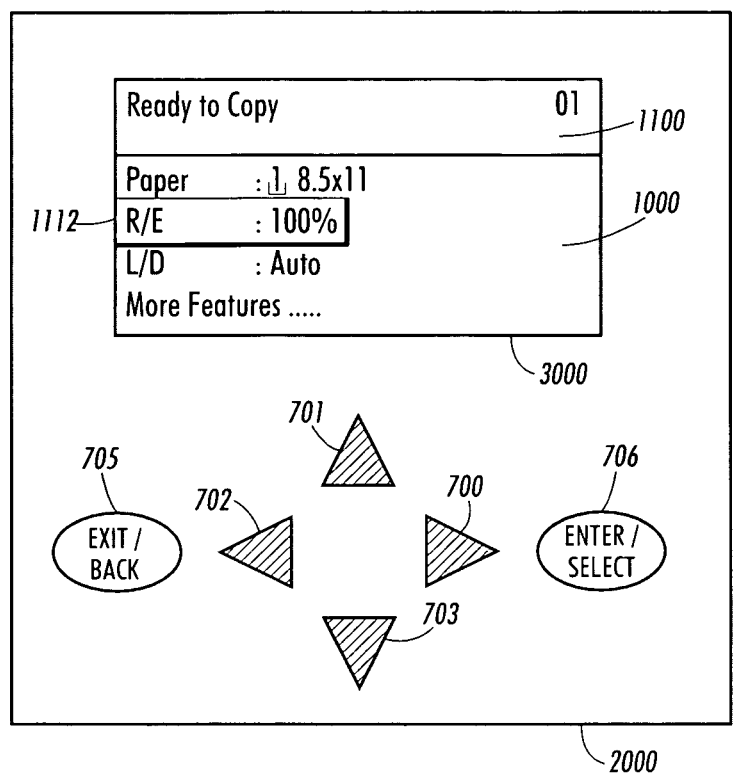
FIG. 12 is a graphical representation of a control panel used for setting magnification values according to the concepts of the present invention.

As noted above, the concepts of the present invention are also applicable to a control panel that uses a non-touch display screen, as illustrated in FIG. 12. More specifically, as illustrated in FIG. 12, a control panel 2000 includes a non-touch display screen 3000 and a plurality of hardwired push buttons 700, 701, 702, 703, and 705. Hardwired push buttons 700, 701, 702, and 703 may be used to navigate on the screen or between screens, as well as, change values displayed on the display screen 3000. Moreover, hardwired push button 705 may be included to allow the user to enter or select the desired value or selection displayed or highlighted on the display screen 3000, and hardwired push button 706 may be included to exit from the existing screen being displayed on the display screen 3000 or go back to the screen previously displayed on the display screen 3000.

As illustrated in FIG. 12, the non-touch display screen 3000 includes a general message area 1100 that may convey general information to the user as to the current status of the device, whether it be, as in this example, the displays indicates that the machine is ready to make a single copy of the original, or an error message indicating the machine has faulted. In the message area 1100, the multifunction machine may also display various messages to assist the user in programming the multifunction machine. The non-touch display screen 3000 also includes a programming display area 1000 that informs the user what values are available for programming as well as possibly the current value. In this example, the programming display area 1000 provides a list of variable value features 1112.

Referring back to FIG. 6 for a non-touch screen embodiment, the programmable area 100 of the non-touch display screen 200 displays the selected variable value feature 112, a present value 113 for the selected variable value feature 112, an increment activatable area 114 that represents the status of either hardwired push button 702 or hardwired push button 703 (depending upon design choice), a decrement activatable area 115 that represents the status of either hardwired push button 700 or hardwired push button 701 (depending upon design choice), and an annotated message 116. The annotated message 116, in this particular example is associated with the predetermined value of 1 to 1 magnification or 100% reduction/enlargement. The value 113 can be changed by a predetermined amount by activating hardwired push button 702 or hardwired push button 703 with user activatable area 114 displaying such activation or by activating hardwired push button 700 or hardwired push button 701 with user activatable area 115 displaying such activation.

Referring back to FIG. 7 for a non-touch screen embodiment, when the user has activated hardwired push button 702 or hardwired push button 703 with user activatable area 114 displaying such activation, the programmable area 100 of the non-touch display screen 200 displays the new present value 113, in this example 99%. However, since the value 99% has not been designated as a preset value for reduction/enlargement or it is not an industry accepted standard, the value 99% does not have an associated annotated message or information stored in a memory, thereby causing the programmable area 100 of the non-touch display screen 200 to display the new present value 113 without any corresponding annotated message.

It is noted that the representative activatable areas 114 and 115 flash or perform a similar event to indicate when a user engages the corresponding push button.

As the user further activates hardwired push button 702 or hardwired push button 703 with user activatable area 114 displaying such activation to decrement the value for the feature, the present value will eventually become associated with another preset value for reduction/enlargement or industry accepted standard value. Such a situation is illustrated in FIG. 8.

As illustrated in FIG. 8, when the present value 113 becomes equal to a preset value for reduction/enlargement or industry accepted standard value, in this example 78%, the programmable area 100 of the non-touch display screen 200 displays the new present value 113 (78%) and the associated annotated information or message 116 (Legal→Letter).

In a preferred embodiment of the present invention, when the programmable area 100 of the non-touch display screen 200 displays a new present value 113 and the associated annotated information or message 116, the device causes the hardwired pushbuttons 700, 701, 702, and 703 to become disabled for a predetermined amount of time to allow the user to recognize that a preset value or industry accepted standard value has been reached. The user activatable areas 114 and 115 of non-touch display screen 200 reflect this disability. After the predetermined amount of time has elapsed, the device enables the hardwired pushbuttons 700, 701, 702, and 703, reflected by the user activatable areas 114 and 115, so that the value 113 may be incremented or decremented by the user.

It is noted that when the value 113 is equal to a minimum or maximum value for the selected variable value feature 112, the representative activatable area 1140 or the representative activatable area 1150 is grayed out, hidden, or some other similar event, indicating to the user that the associated push button has been disabled.

As the user further decrements the value for the feature, the present value will eventually become associated a lower limit for the feature. Such a situation is illustrated in FIG. 9.

As illustrated in FIG. 9, when the present value 113 becomes equal to the lower limit value for reduction/enlargement, in this example 25%, the programmable area 100 of the non-touch display screen 200 displays the new present value 113 (25%) and de-highlights user activatable area 1140 to inform the user that the associated hardwired push buttons (702 or 703) are disabled and the value cannot be taken any lower. However, hardwired push buttons (700 or 701) remain active as reflected by activatable area 115 remaining highlighted.

On the other hand, as the user further increments the value for the feature, the present value will eventually become associated an upper limit for the feature. Such a situation is illustrated in FIG. 10.

As illustrated in FIG. 10, when the present value 113 becomes equal to the upper limit value for reduction/enlargement, in this example 400%, the programmable area 100 of the non-touch display screen 200 displays the new present value 113 (100%) and de-highlights user activatable area 1150 to inform the user that the associated hardwired push buttons (701 or 700) are disabled and the value cannot be taken any higher. However, hardwired push buttons (702 or 703) remain active as reflected by activatable area 114 remaining highlighted. It is further noted that the upper limit value (400%) is also associated with a preset value for reduction/enlargement or industry accepted standard value so that the programmable area 100 of the non-touch display screen 200 displays the associated annotated message or information 116 (Poster).

Upon setting the machine to the desires values, the programmable area 100 of the non-touch display screen 200 reverts back to a current status display as shown in FIG. 11. In FIG. 11, the new present value of the feature 112 is displayed along with it associated annotated message or information 1120, if any. In this example, the programmable area 100 of the non-touch display screen 200 displays the new present value of the feature 112 (78%) and its associated annotated information 1120 (Legal→Letter).

Figure 13:
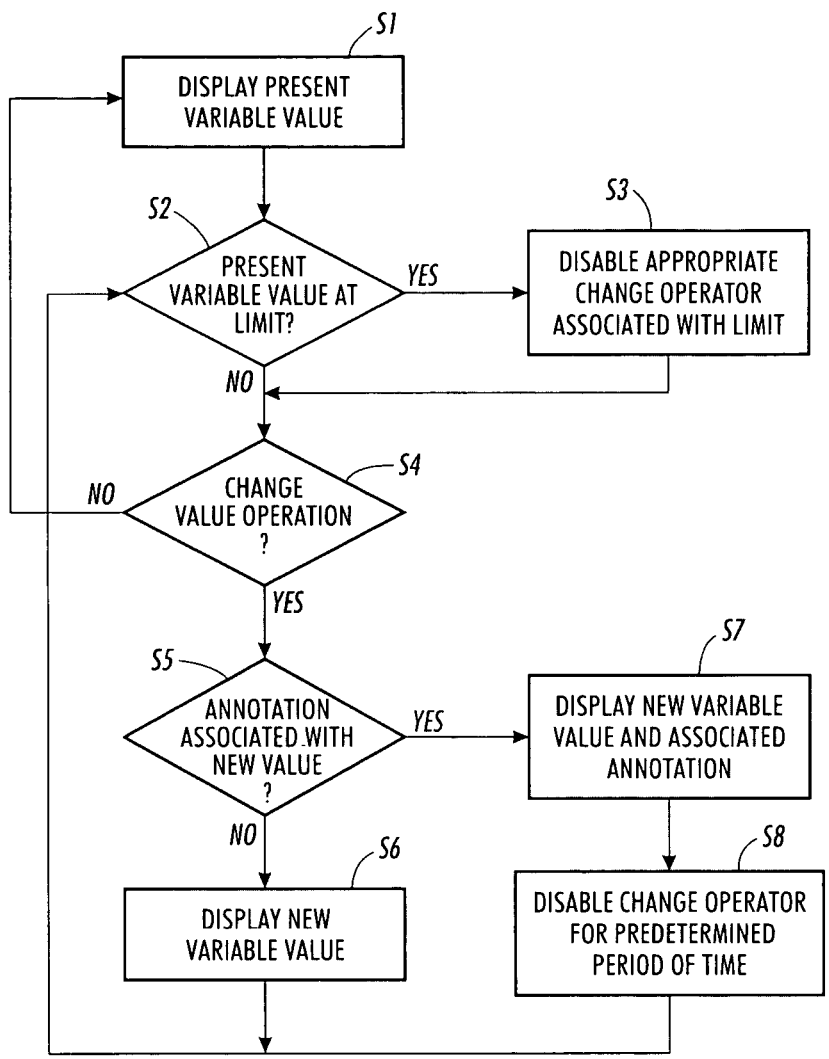
FIG. 13 is a flowchart illustrating a method of setting a variable value feature according to the concepts of the present invention.

FIG. 13 illustrates a flowchart for setting a variable value feature, according to the concepts of the present invention. As illustrated in FIG. 13, at Step S1, the present invention displays a screen with a present value of a variable value feature. A variable value feature may have a plurality of values associated therewith wherein the plurality of values include a default value and a plurality of non-default values, and preferably upper and lower limit values. An example of such a screen is illustrated in FIG. 6.

At Step S2, the controller determines whether the present value of the variable value feature being displayed on the screen is either a minimum or maximum value for the variable value feature. If the controller determines that the value is equal to either the minimum or maximum value for the variable value feature at step S2, the controller will disable the appropriate change operator associated with the limit, at step S3. If the value is the minimum value for the variable value feature, the controller disables the decrementing function; e.g. the activatable area 1140 as illustrated in FIG. 9. If the value is the maximum value for the variable value feature, the controller disables the incrementing function; e.g. the activatable area 1150 as illustrated in FIG. 10.

At step S4, the controller determines if the user has activated either an activatable area or pushbutton so as to cause the present value to be incremented or decremented by a predetermined amount so that a new value is to be displayed. If the value has not been incremented or decremented, the present value remains the same and is displayed on the screen. If the value has been incremented or decremented, the controller, at step S5, determines if the new value has an associated annotation message.

If the controller determines that the new value does have an associated annotation message, the controller, at step S7, displays the new value and the associated annotation message. An example of such a display is illustrated in FIG. 8. In addition, should the controller determine that the new value has an associated message, the controller, at step S8, will disable the incrementing and decrementing functions; e.g., the activatable areas as illustrated in FIGS. 9 and 10 for a predetermined period of time, thereby preventing an operator from changing the new value while alerting the operator to the annotated message.

If the controller determines that the new value does not have an associated annotation message at Step S5, the controller, at Step S6, will display the new value as illustrated in FIG. 7.

Although the present invention has been described in detail above, various modifications can be made without departing from the spirit of the invention. For example the above description describes the present invention as a touch-sensitive video screen as the user interface. As an alternative, the user interface could be a video screen which interacts with a point and click device such as a mouse or a video screen which is light sensitive or magnetically sensitive so as to response to a light or magnetic pen.

Moreover, the present invention, as noted above, is not limited to reduction/enlargement or magnification function. The concepts of the present invention can be applied to any variable value feature including facsimile transmission and contrast.

Accordingly, while the present invention has been described with reference to various embodiments as described above, it is not confined to the details set forth above, but is intended to cover such modifications or changes as may come within the scope of the attached claims.

What is claimed is:

1. A method of setting a variable value feature, having a plurality of values associated therewith wherein the plurality of values include a default value and a plurality of non-default values, on a user interface, the user interface having user activatable areas enabling a selection and changing of the variable value feature, comprising:
   (a) displaying, on the user interface, a first numeric value associated with a user selected variable value feature;
   (b) changing the displayed first numeric value associated with the selected variable value feature by a predetermined numeric amount so as to display a second numeric value associated with the selected variable value feature by a user engaging a user activatable area of the user interface associated with the selected variable value feature;
   (c) determining if an annotated message is associated with the displayed second numeric value associated with the selected variable value feature, the annotated message expressing information equivalent to the displayed second numeric value in a non-numeric form;
   (d) displaying the annotated message associated with the selected variable value feature along with the displayed second numeric value associated with the selected variable value feature when it is determined that the displayed second value associated with the selected variable value feature has an associated annotation message; and
   (e) displaying no annotated message when it is determined that the displayed second numeric value associated with the selected variable value feature has no associated annotation message.

2. The method as claimed in claim 1, wherein the selected variable value feature is a magnification function.

3. The method as claimed in claim 1, wherein the selected variable value feature is a facsimile transmission function.

4. The method as claimed in claim 1, wherein the selected variable value feature is a contrast function.

5. The method as claimed in claim 1, further comprising:
   (f) disabling the user activatable area of the user interface associated with the selected variable value feature for a predetermined period of time when it is determined that the displayed second numeric value associated with the selected variable value feature has an associated annotation message so as to allow the user to become aware of the displayed annotated message.

6. The method as claimed in claim 1, further comprising:
   (f) determining whether the displayed second numeric value associated with the selected variable value feature is a minimum value for the selected variable value feature;
   (g) disabling a user activatable area of the user interface associated selected variable value feature that enables the value of the selected variable value feature to be decremented when it is determined that the displayed second numeric value associated with the selected variable value feature is a minimum value for the selected variable value feature;
   (h) determining whether the displayed second numeric value associated with the selected variable value feature is a maximum value for the selected variable value feature; and
   (i) disabling a user activatable area of the user interface associated selected variable value feature that enables the value of the selected variable value feature to be incremented when it is determined that the displayed second numeric value associated with the selected variable value feature is a maximum value for the selected variable value feature.

7. A user interface for selecting and setting a variable value feature, having a plurality of values associated therewith wherein the plurality of values includes a default value and a plurality of non-default values, comprising:

a display area to display a first numeric value associated with a user selected variable value feature;

a user activatable area to change the displayed first numeric value associated with the selected variable value feature by a predetermined numeric amount so as to display a second numeric value associated with the selected variable value feature;

a memory for storing a number of annotated messages, each annotated message being associated a numeric value of the user selected variable value feature, the annotated message expressing information equivalent to the associated numeric value of the user selected variable value feature in a non-numeric form; and a controller to determine if a stored annotated message is associated with the displayed second numeric value associated with the selected variable value feature;

said controller causing said display area to display the annotated message associated with the selected variable value feature along with the displayed second numeric value associated with the selected variable value feature when it is determined that the displayed second numeric value associated with the selected variable value feature has an associated annotation message;

said controller causing said display area to display no annotated message associated when it is determined that the displayed second numeric value associated with the selected variable value feature has no associated annotation message.

8. The user interface as claimed in claim 7, wherein said user activatable area includes an up user activatable area to increment the displayed first numeric value associated with the selected variable value feature by a predetermined numeric amount and a down user activatable area to decrement the displayed first numeric value associated with the selected variable value feature by a predetermined numeric amount.

9. The user interface as claimed in claim 7, wherein said controller disables the user activatable area of the user interface associated with the selected variable value feature for a predetermined period of time when it is determined that the displayed second numeric value associated with the selected variable value feature has an associated annotation message so as to allow the user to become aware of the displayed annotated message.

10. The user interface as claimed in claim 8, wherein said up user activatable area is a first push button and said down user activatable area is a second push button.

11. The user interface as claimed in claim 8, wherein said up user activatable area is a first area on a touch screen and said down user activatable area is a second area on a touch screen.

12. The user interface as claimed in claim 7, wherein said controller determines whether the displayed second numeric value associated with the selected variable value feature is a minimum value for the selected variable value feature; disables a user activatable area of the user interface associated selected variable value feature that enables the numeric value of the selected variable value feature to be decremented when it is determined that the displayed second numeric value associated with the selected variable value feature is a minimum value for the selected variable value feature; determines whether the displayed second numeric value associated with the selected variable value feature is a maximum value for the selected variable value feature; and disables a user activatable area of the user interface associated selected variable value feature that enables the numeric value of the selected variable value feature to be incremented when it is determined that the displayed second numeric value associated with the selected variable value feature is a maximum value for the selected variable value.

13. The user interface as claimed in claim 7, wherein the selected variable value feature is a magnification function.

14. The user interface as claimed in claim 7, wherein the selected variable value feature is a facsimile transmission function.

15. The user interface as claimed in claim 7, wherein the selected variable value feature is a contrast function.

16. A method of setting a variable value feature on a control panel, the variable value feature having a plurality of values associated therewith, wherein the plurality of values include a default value, at least one industry accepted standard value, and a plurality of non-default values, the control panel having user activatable areas enabling a selection and changing of the variable value feature, comprising:

(a) displaying, on a display device, a first numeric value associated with a user selected variable value feature;

(b) changing the displayed first numeric value associated with the selected variable value feature by a predetermined numeric amount so as to display a second numeric value associated with the selected variable value feature by a user engaging one of the user activatable areas of the control panel associated with the selected variable value feature;

(c) determining if the displayed second numeric value is an industry accepted standard value associated with the displayed second numeric value;

(d) displaying an annotated message corresponding to the industry accepted standard value along with the displayed second numeric value associated with the selected variable value feature when it is determined that the displayed second numeric value is an industry accepted standard value associated with the selected variable value feature, the annotated message expressing the industry accepted standard value associated with the displayed second numeric value in a non-numeric form; and (e) displaying no annotated message when it is determined that the displayed second numeric value is not an industry accepted standard value associated with the selected variable value feature.

17. The method as claimed in claim 16, further comprising:

(f) disabling the user activatable areas of the control panel associated with the selected variable value feature for a predetermined period of time when it is determined that the displayed second numeric value is an industry accepted standard value associated with the selected variable value feature so as to allow the user to become aware of the displayed annotated message.

18. The method as claimed in claim 16, further comprising:

(f) determining whether the displayed second numeric value associated with the selected variable value feature is a minimum value for the selected variable value feature;

(g) disabling a user activatable area of the control panel associated selected variable value feature that enables the value of the selected variable value feature to be decremented when it is determined that the displayed second numeric value associated with the selected variable value feature is a minimum value for the selected variable value feature.

19. The method as claimed in claim 16, further comprising:
(f) determining whether the displayed second numeric value associated with the selected variable value feature is a maximum value for the selected variable value feature; and
(g) disabling a user activatable area of the control panel associated selected variable value feature that enables the value of the selected variable value feature to be incremented when it is determined that the displayed second numeric value associated with the selected variable value feature is a maximum value for the selected variable value feature.

20. The method as claimed in claim 16, further comprising:
(f) disabling the user activatable areas of the control panel associated with the selected variable value feature for a predetermined period of time when it is determined that the displayed numeric second value is an industry accepted standard value associated with the selected variable value feature so as to allow the user to become aware of the displayed annotated message;
(g) determining whether the displayed second numeric value associated with the selected variable value feature is a minimum value for the selected variable value feature;
(h) disabling a user activatable area of the control panel associated selected variable value feature that enables the value of the selected variable value feature to be decremented when it is determined that the displayed second numeric value associated with the selected variable value feature is a minimum value for the selected variable value feature;
(i) determining whether the displayed second numeric value associated with the selected variable value feature is a maximum value for the selected variable value feature; and
(j) disabling a user activatable area of the control panel associated selected variable value feature that enables the value of the selected variable value feature to be incremented when it is determined that the displayed second numeric value associated with the selected variable value feature is a maximum value for the selected variable value feature.

* * * * *